United States Patent [19]
Schaldach

[11] Patent Number: 6,158,780
[45] Date of Patent: Dec. 12, 2000

[54] COUPLING FOR USE IN SUPPLYING AIR PRESSURE TO AN AIR DRIVEN PUMP ON A PALLET

[75] Inventor: Kurt Schaldach, Strongsville, Ohio

[73] Assignee: Automation Enhancements Unlimited, Cleveland, Ohio

[21] Appl. No.: 09/143,793

[22] Filed: Aug. 31, 1998

[51] Int. Cl.[7] .................................................. F16L 25/00
[52] U.S. Cl. ........................... 285/9.2; 285/101; 285/302; 269/25; 269/309
[58] Field of Search .................... 285/9.2, 100, 101, 285/302; 269/25, 309

[56] References Cited

U.S. PATENT DOCUMENTS

| | | | |
|---|---|---|---|
| 3,422,864 | 1/1969 | Allinquant | 285/101 |
| 3,727,952 | 4/1973 | Richardson | 285/101 |
| 3,825,223 | 7/1974 | Richardson | 285/101 |
| 5,533,762 | 7/1996 | Carmona | 285/101 |

*Primary Examiner*—Dave W. Arola
*Attorney, Agent, or Firm*—Woodling, Krost and Rust

[57] ABSTRACT

A coupling for use in supplying air pressure to an air driven pump on a pallet is disclosed. The male half of the coupling is affixed to a pallet changing station and the female half is suspended from a pallet. Suspension of the female half from the pallet enables the male and the female half to couple despite misalignment. The male half includes two pistons and the female half includes a power port, a vent port and a central port. The power port is connected to an air driven hydraulic pump and the control port is connected to a pilot on a four-way valve. The hydraulic pump operates vides contained on the pallets. The number of vices operable is only limited by the capacity of the hydraulic reservoir located in the pallet.

11 Claims, 11 Drawing Sheets

COUPLING FOR USE IN SUPPLYING AIR PRESSURE TO AN AIR DRIVEN PUMP ON A PALLET

FIELD OF THE INVENTION

This invention relates to an automatic pallet clamping device for automatically coupling and uncoupling a workpiece on a pallet. A pallet is a large worktable which slides into and out of a machining center. The workpieces are secured in place during the machining process by locking them within a hydraulic vice, swing clamps or toe clamps located on the pallet. The vice is affixed to the pallet which slides into and out of the machine center. When the pallet and device are located inside the machining the center, machining takes place on the workpiece. The pallet is brought out of the machining center for the purpose of either exchanging workpieces within the vice or inserting new workpieces in the vice.

The instant invention is particularly useful in that it enables several different pallets to be operated by one automatic pallet changing station. The automatic pallet changing station includes the male half of the coupling. The female half of the coupling is suspended from the pallet. The suspension of the female half of the coupling from the pallet enables the coupling to be coupled despite misalignment between the male and female halves of the coupling.

BACKGROUND OF THE INVENTION

My U.S. Pat. No. 5,662,316 issued Sep. 2, 1997 and my U.S. Pat. No. 5,794,324, issued Aug. 18, 1998 disclose and claim a pallet couple and decouple clamping apparatus and method for pallet coupling and decoupling.

The invention includes a male half and a female half of the coupling. The male half includes a first outer piston and a second inner piston which mate with a receiver having a control port, vent port and a power port. The power port of the receiver drives an air driven pump which either clamps a vice or unclamps a vice. An accumulator is used to store hydraulic fluid under pressure when the machining table or pallet is in the machining center.

THE OBJECTS AND SUMMARY OF THE INVENTION

It is an object of the present invention to provide a coupling for use in clamping and unclamping workpieces in a vice on a pallet.

It is an object of this invention to provide a coupling comprised of a male half and a female half. The male half of the coupling is part of the automatic pallet changing station and the female half of the coupling resides as part of the pallet.

It is an object of the present invention to provide a coupling whose female half is suspended from a pallet. The coupling is suspended from the pallet so as to enable alignment of the male and the female halves of the coupling.

It is an object of the present invention to provide a coupling having a female half having a power port, a vent port, and a control port. The control port is interconnected with a pilot on a four-way valve. The vent port simply leads to atmosphere. And the power port is interconnected with the pump acting as a switch to turn the pump on and off. The four-way valve directs the air passing through the power port to the air driven hydraulic pump. The air driven hydraulic pump either supplies hydraulic fluid to the vice to clamp the vice or it withdraws hydraulic fluid from the vice to unclamp the vice.

It is a further object of the present invention to provide a female half of a coupling for use in supplying air pressure to an air driven pump (intensifier) having an annular chamber therein and also having a seat thereon at the point of the opening into the vent port.

It is an object of the present invention to provide a coupling having a male half which includes a first outer piston and a second inner piston. A spring resides between the first outer piston and the second inner piston. The first outer piston includes a plug at one end thereof. The outer piston includes a passageway which enables air to travel therethrough to an annular chamber of the receiver which leads to the power port of the receiver when the coupling is coupled. The inner piston includes a passageway therethrough which communicates with the control port when the inner piston is extended, or put another way telescoped, to its maximum extent in the direction of the receiver. The inner piston has a generally conically shaped end portion which abuts against the seat on the receiver and prohibits venting through the receiver.

It is an object of the present invention to provide a male half of a coupling which includes a lower gland and an upper gland. The lower and upper glands are connected by rods which are threaded into the upper and lower glands. Other means may be employed to interconnect the upper and lower glands.

It is an object of the present invention to provide a cylinder which extends from the upper gland to the lower gland. The upper and lower glands may be connected to the cylinder in several different ways. The present disclosures illustrates interconnecting the upper and lower glands and thus securing the cylinder to the upper and lower glands by means of threaded studs.

It is an object of the present invention to provide a passageway by which air may be supplied to a chamber formed between the lower gland and the first outer piston. The first outer piston includes a plug at one end thereof and a chamber is formed and bounded by the plug, the first outer piston, the cylinder, and the lower gland.

It is a further object of the present invention to provide a retraction port in the upper gland which urges the outer piston away from the receiver and uncouples the coupling. A pressure supply line interconnects a pressure source and the retraction port.

It is an object of the present invention to provide a cylinder which includes a lower port for the admission of air therein and an upper port for the admission of air therein. The lower and upper ports in the cylinder communicate with lower and upper chambers formed between the outer piston and the cylinder. The outer piston includes a port which communicates with the lower chamber and enables air pressure to be admitted into a chamber bounded by the plug and the inner piston. It is through this passageway that air is admitted into the aforesaid chamber and into the passageway of the inner piston. When the chamber bounded by the plug, the outer piston and the inner piston is pressurized the inner piston is extended beyond the outer piston and permits communication with the control port of the receiver.

It is an object of the present invention to provide an upper port in the cylinder which communicates with an upper chamber formed between the outer piston and the cylinder. The upper chamber communicates with a passageway in the outer piston. The passageway and the outer piston communicates with an annular chamber which resides in the receiver when the male and female halves of the coupling are connected.

It is an object of the present invention to provide rings which admit pressurized air into the ports of the cylinder.

A coupling for use and supplying air pressure to an air driven pump on a pallet comprising a male half affixed to a pallet changing station, and a female half suspended from a pallet is disclosed. The female half includes a vent port, a power port and a control port. The male half includes a first outer piston having a first passageway and a second inner telescoping piston having a second passageway within the first outer piston. The second inner piston is movable between first and second positions. The female half includes a shoulder which engages but does not seal against the first piston permitting communication between the first passageway of the first outer piston and the vent and power port of the female half when the male half and female half are coupled and the second inner piston is in its first position. The second passageway of the second inner piston communicates with the control port of the female half and the first passageway of the first outer piston communicates with the power port of the female half when the male half and female half are coupled together and the second piston is in its second position. In its second position, the second inner piston seals the vent port in the receiver.

Other objects and purposes of the invention will be best understood when taken in conjunction with the Brief Description of the Drawings and the Detailed Description of the Invention which follow hereinbelow.

BRIEF DESCRIPTION OF THE DRAWINGS

FIG. 11 illustrates air pressure being applied to the pilot port of the four-way valve.

A better understanding of the foregoing drawings can be had when taken in conjunction with the Detailed Description of the Invention which follows below.

DETAILED DESCRIPTION OF THE INVENTION

Figure 1:
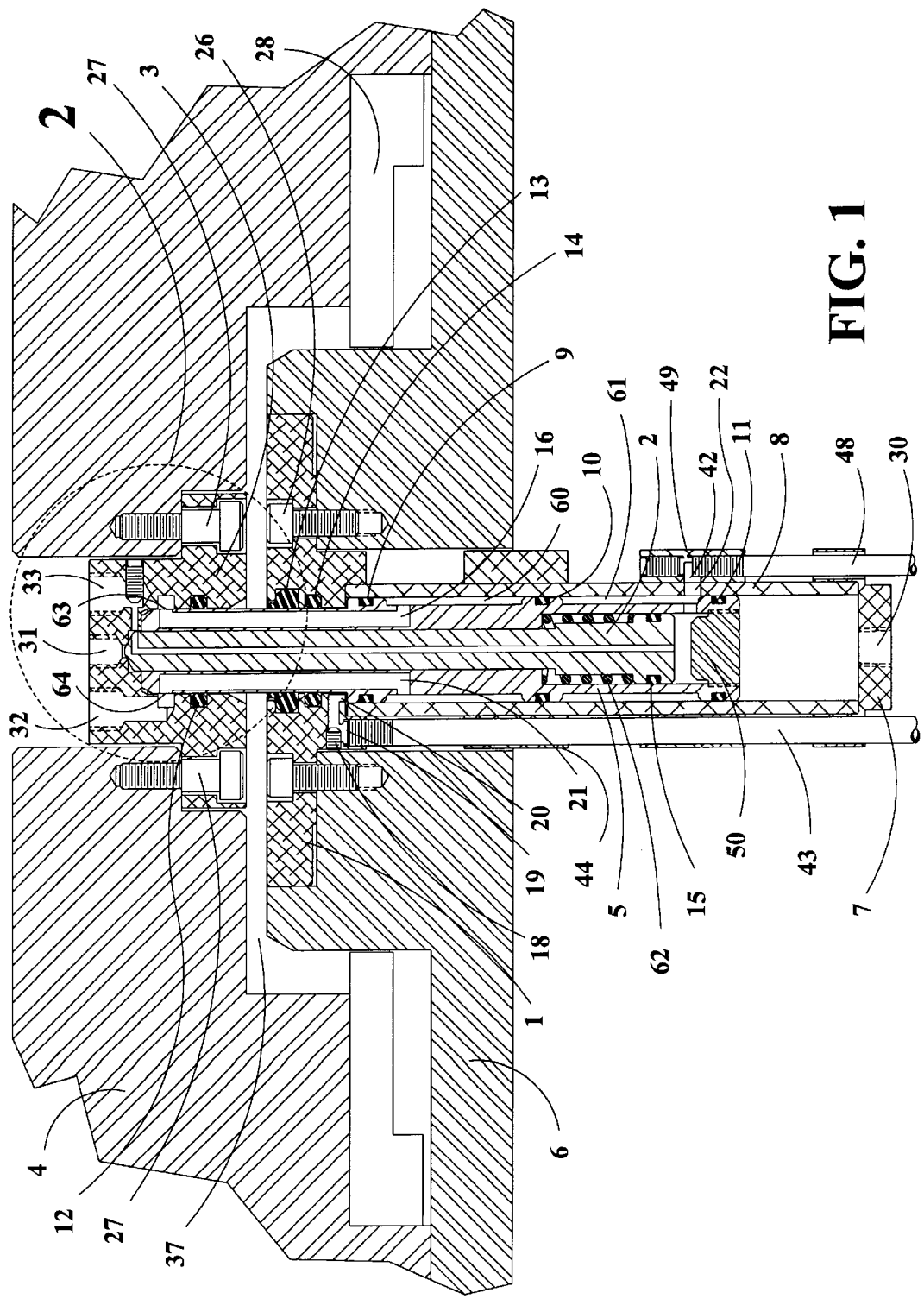
FIG. 1 illustrates the coupling of the present invention in cross section. The coupling is illustrated as being coupled together with air pressure being supplied to the control port.
Figure 4:
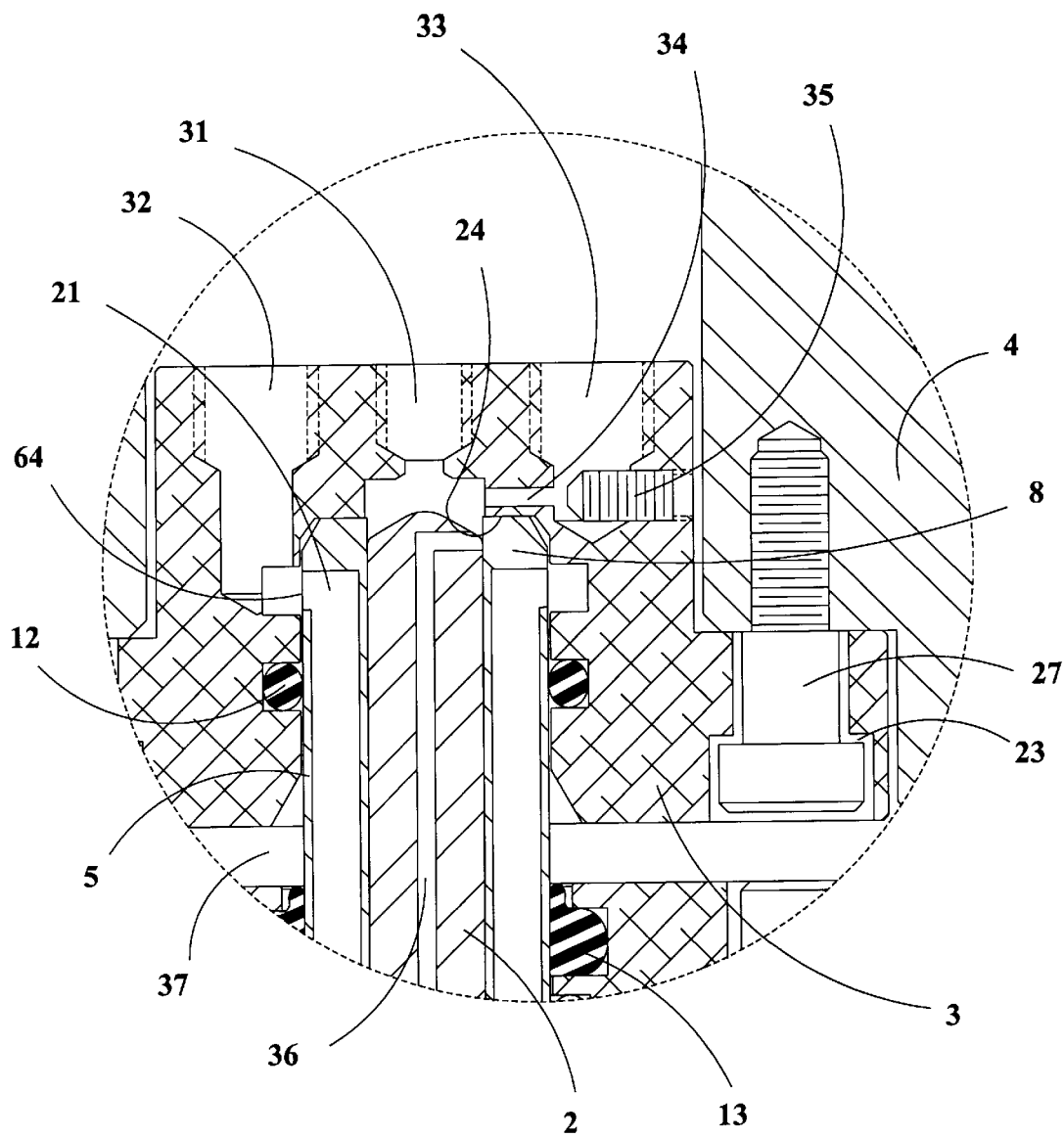
FIG. 4 is an enlargement of a portion of FIG. 3.

FIG. 1 illustrates the upper gland 1 and the lower gland 7. Upper gland 1 is affixed to the automatic pallet changer 6 by bolts 26. Stripper bolts 27 affix the receiver 3 to the pallet 4. As illustrated in FIG. 4 the receiver 3 is illustrated as being flush up against the pallet 4 in a vertical direction. In other words there is a gap between the stripper bolts 27 and the receiver 3.

Cylinder 8 resides between the lower gland 7 and the upper gland 1. There are many ways that the cylinder may be affixed to the lower and upper glands. In the embodiment illustrated the cylinder is affixed between the lower and the upper glands by means of threaded screws. See, FIG. 8.

Figure 5:
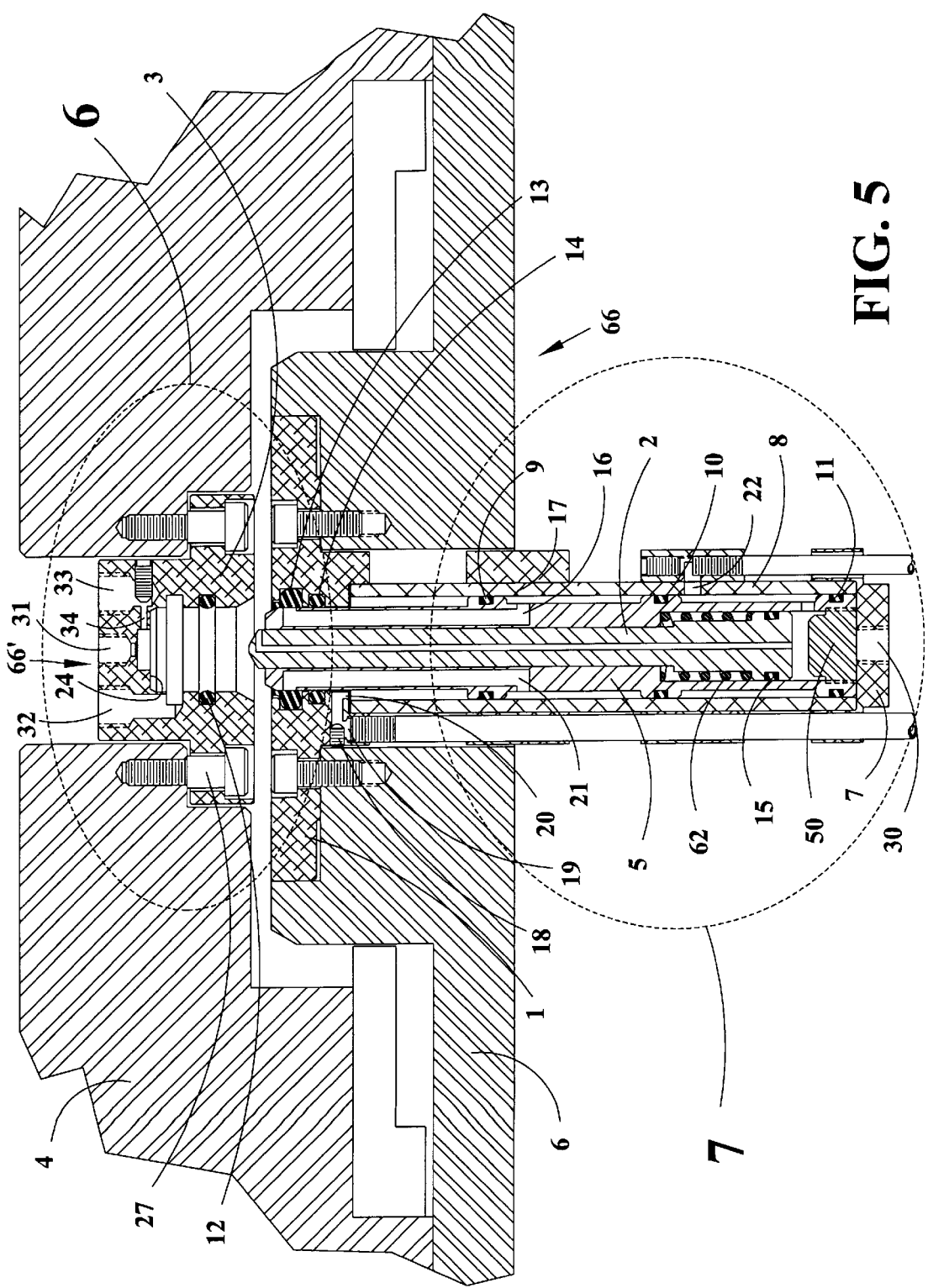
FIG. 5 is a cross sectional view of the coupling in its uncoupled state.

FIG. 1 also illustrates the outer piston 5 and the inner piston 2 of the male half of the coupling. The male half of the coupling is best illustrated in FIG. 5 by reference numeral 66. The female half of the coupling is indicated by reference numeral 66'. The male half 66 of the coupling is affixed to the automatic pallet changing station 6. FIG. 5 also illustrates the female half 66' of the coupling and it is affixed to the pallet 4. FIG. 5 illustrates that the receiver 3 hangs or is suspended from the pallet 4 by stripper bolts 27.

Reference numeral 9 indicates a seal between the outer piston 5 and the cylinder 8. Reference numeral 10 likewise is a seal between the outer piston 5 and cylinder 8. Reference numeral 11 indicates a seal between the outer piston 5 and cylinder 8. Reference numeral 12 indicates a seal between the receiver 3 and the outer piston 5. Reference numeral 13 indicates a seal between the upper gland 1 and the outer piston 5. Reference numeral 15 indicates a seal between the inner piston 2 and the outer piston 5. The outer piston 5 includes a first passageway 16 interconnecting chamber 60 also known as the upper chamber, port 17 and port 63. See FIGS. 1 and 8. Second passageway 21 interconnects the upper chamber 60, port 17 and port 64. The outer piston is generally cylindrically shaped and the first passageway 16 and second passageway 21 are essentially longitudinal bores through the outer piston.

Reference numeral 17 is the upper port in cylinder 8. See FIG. 8. Upper port 17 communicates with upper chamber 60 which supplies air to passageways 60 and 21. Passageways 16 and 21 supply air to annular chamber 51. See FIG. 6.

Set screw 18 in upper gland 1 seals the supply port 19 in the upper gland. Supply port 19 supplies air to the retraction port 20 in the upper gland to push the outer piston in a downward direction.

Figure 8:
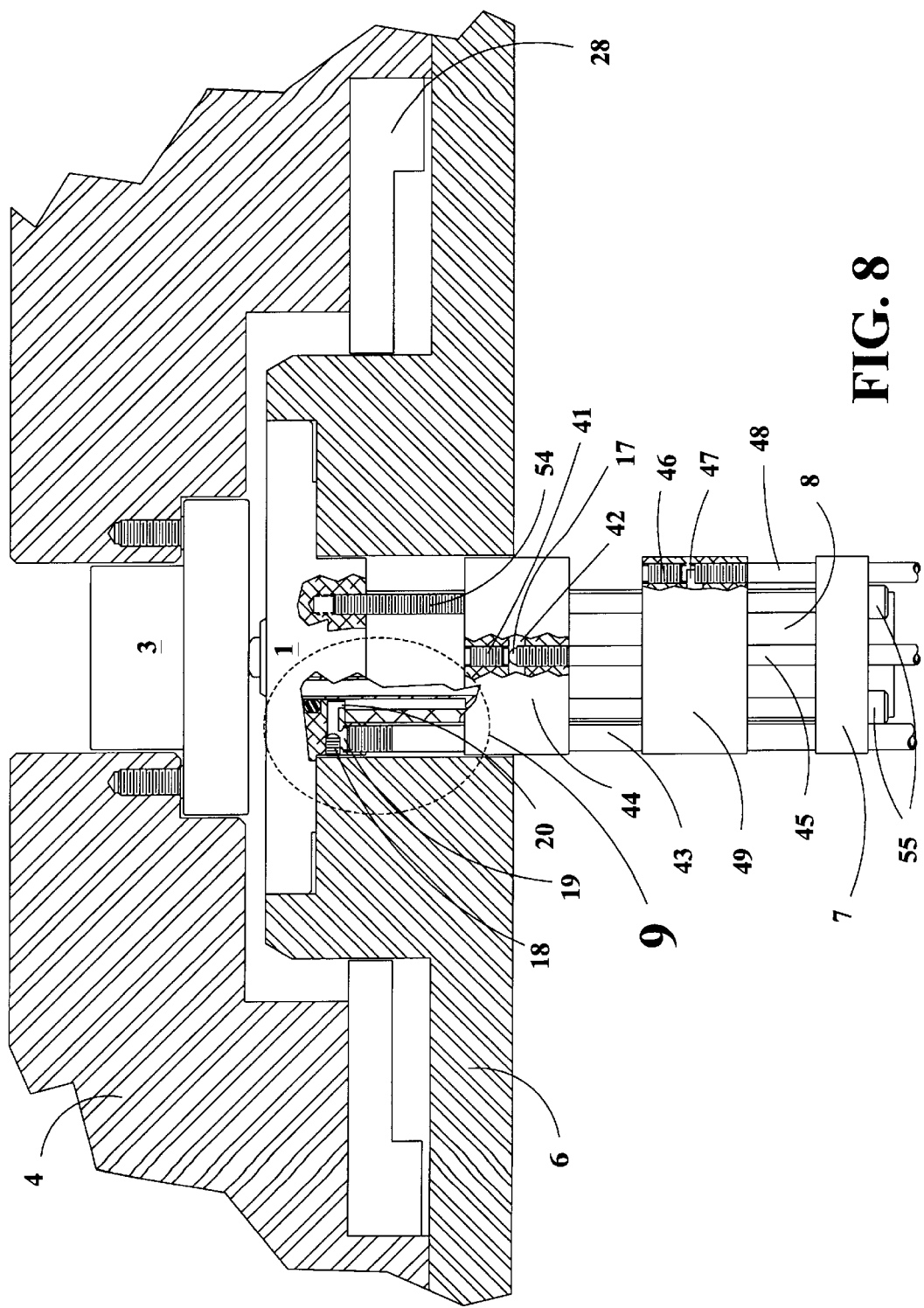
FIG. 8 is a plan view of the invention in its uncoupled state.

FIGS. 1 and 8 illustrate a tube 43 supplying air pressure to the retraction port. Tube 48 as illustrated in FIG. 1 supplies air to the lower air supply ring 49 and port 22. Port 22 is the lower port in cylinder 8.

Referring to FIG. 1, reference numeral 28 represents a ring gear for changing the pallets. Reference numeral 37 indicates a space or gap between the automatic pallet changer and the pallet 4. Upper chamber 60 is formed between the outer piston 5 and the cylinder 8. Lower chamber 61 is formed between the outer piston 5 and the cylinder 8. Spring 62 resides between the outer piston 5 and the inner piston 2. Port 63 leads from the bore 16 to the annular chamber 51. See FIG. 2.

Figure 6:
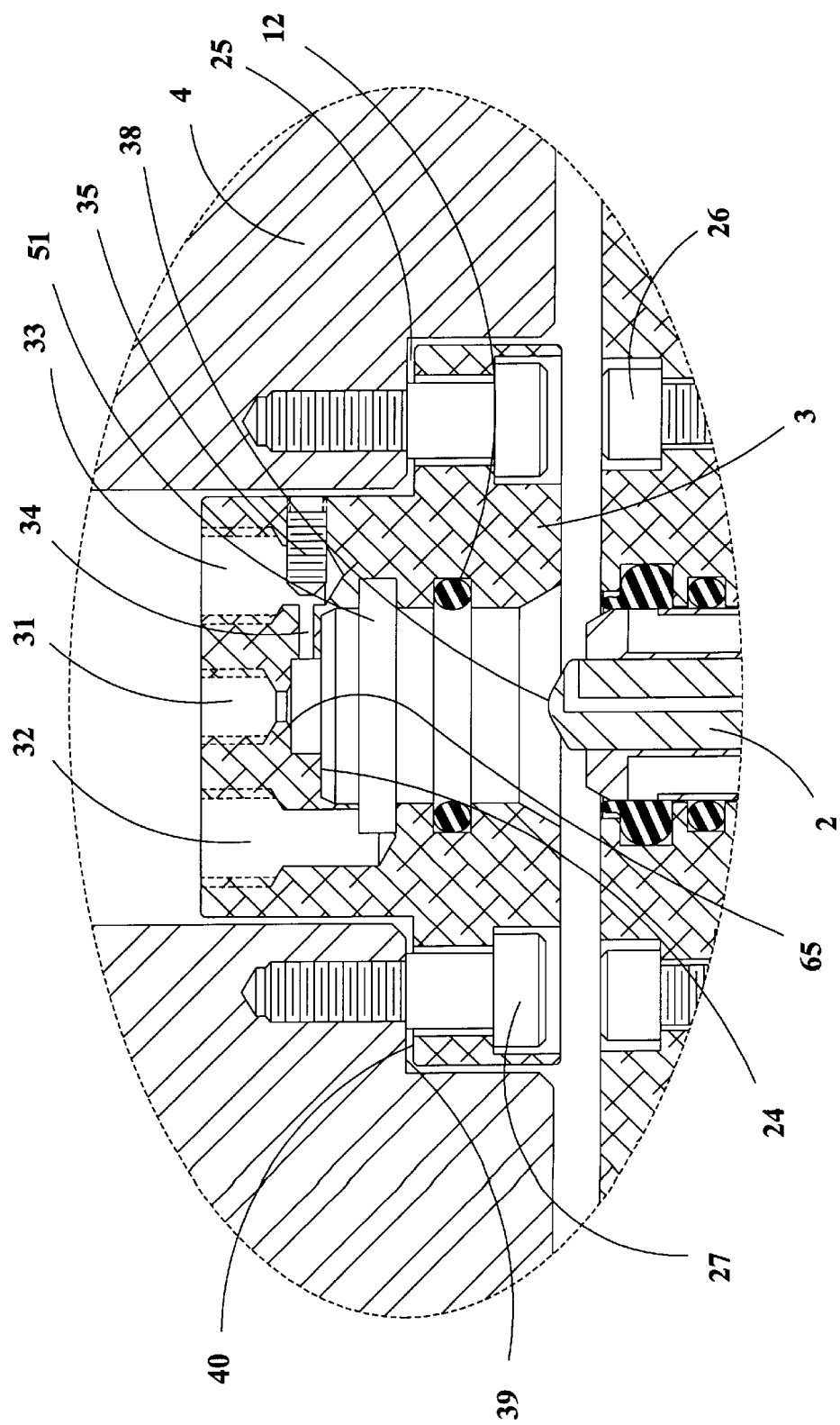
FIG. 6 is an enlargement of a portion of FIG. 5.

Gap 25 is illustrated on FIG. 6 and indicates that the receiver 3 is hanging with respect to pallet 4. This enables coupling although the male half of the coupling and the female half of the coupling may be slightly misaligned. Referring still to FIG. 6, seal face 24 is shown as a shoulder on the receiver 3. This shoulder 24 abuts the outer piston 5 during coupling. However air may flow around this surface. In the condition where the second piston sometimes referred to herein as the inner piston is not fully extended, air will flow around the seal face 24 and out the vent port 31 in the receiver. The receiver includes an air pressure port 32, a vent port 31, and an air pressure supply port 33 which is connected to the pilot on the four-way valve 68. The port 32 communicates air supplied to the chamber 51 to run the air driven pump on the pallet.

Figure 3:
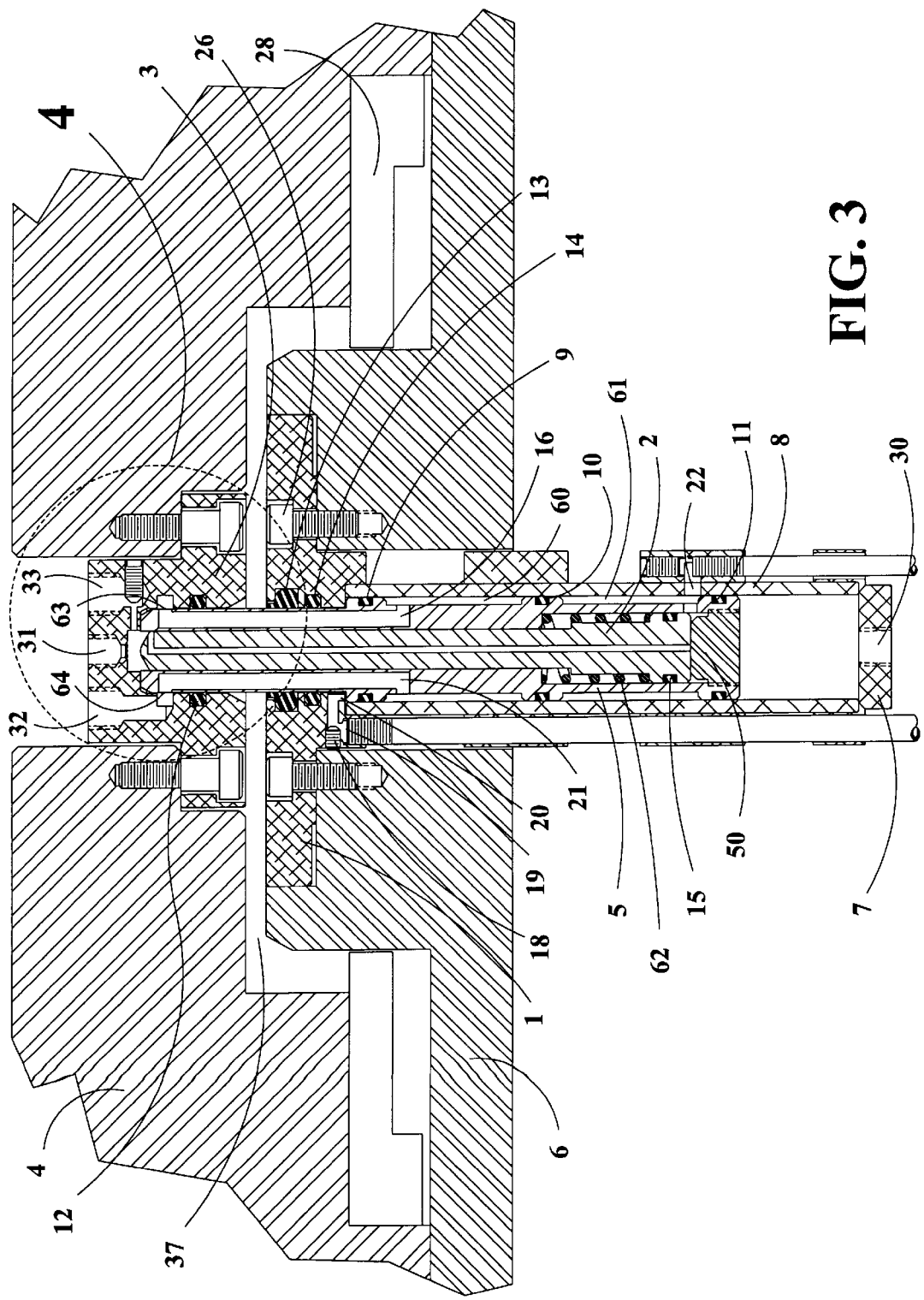
FIG. 3 is a view similar to FIG. 1 although the second inner piston is shown abutting the plug. In this position known as its first position the inner piston is not supplying air to the control port of the receiver.

Referring to FIG. 3 air supply port 30 is illustrated. Air is admitted to port 30 and resides in a chamber bounded by a threaded plug 50 in the outer piston 5, the outer piston 5 cylinder 8, and lower gland 7. When sufficient air pressure is applied (which air pressure is 100 psi in the instant invention) to this chamber, the outer piston, sometimes referred to herein as the first piston, and the inner piston, sometimes referred to herein as the second piston, are driven upwardly when viewing FIG. 5 toward the receiver 3. When air pressure is admitted into port 22 it tends to separate the inner piston 2 from plug 50 and move it upwardly toward the receiver 3. As shown in FIG. 3 no air pressure has been supplied to port 22.

Referring to FIG. 4 it can be seen that the outer piston 8 engages the receiver along seal face 24. Seal face 24 is best viewed in FIG. 6. FIG. 6 illustrates set screw 35 sealing the passageway 34 and port 33 from the exterior of the receiver 3. Passageway 34 interconnects the bore of the receiver with port 33 which leads to the pilot on the four-way valve 68.

Figure 7:
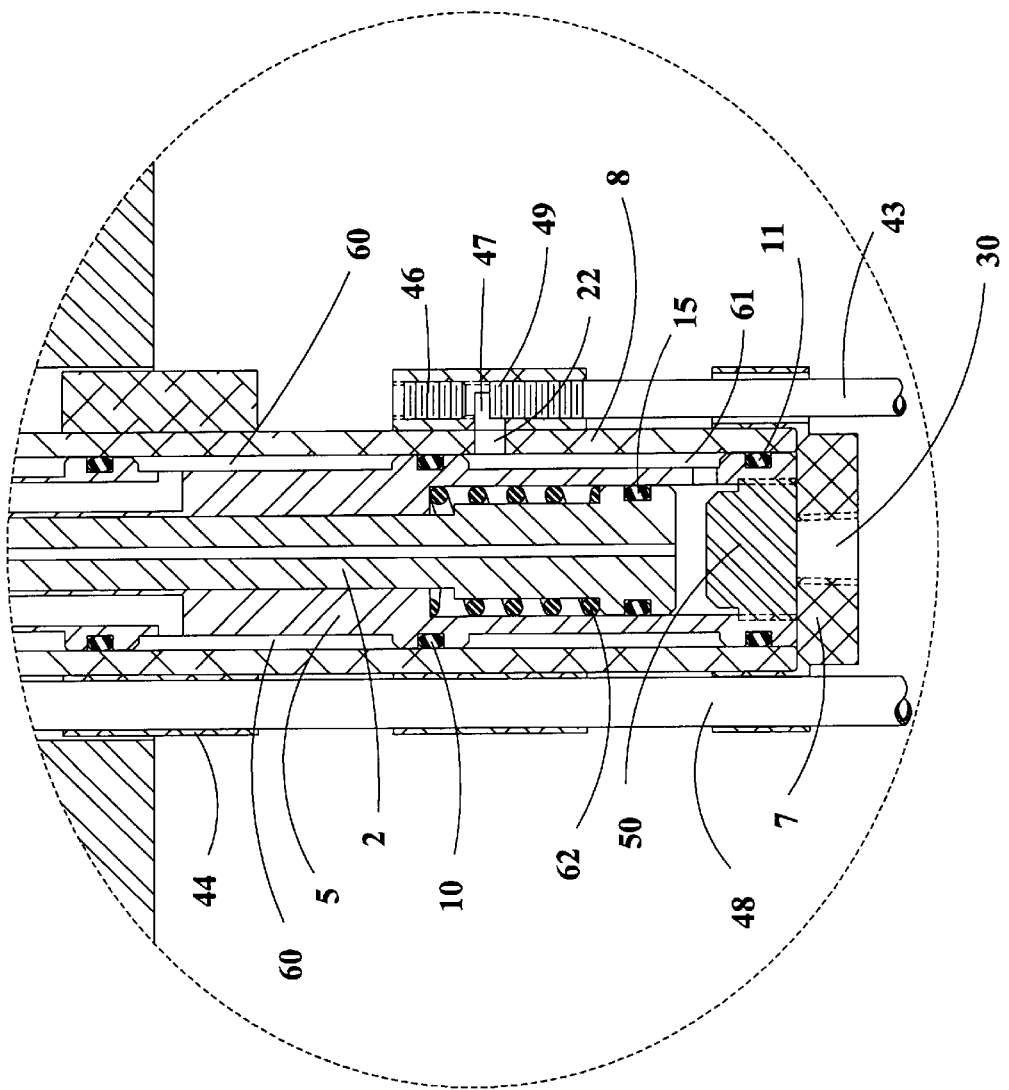
FIG. 7 is an enlargement of a portion of FIG. 5.

FIG. 7 is an enlargement of the portion of FIG. 5. FIGS. 5 and 7 illustrate the lower supply ring 49. Reference numeral 36 is the passageway in the inner piston which interconnects with the passageway 34 in the receiver. Reference numeral 36 appears in most of the views of the drawing figures.

FIG. 8 is a plan view showing the coupling in its disconnected state. Reference numeral 44 illustrates the upper air supply ring, reference numeral 45 illustrates the tube or air conduit supplying port 17 in the outer piston and supplying the upper ring 44. Reference numeral 54 indicates one of a plurality of connecting rods connecting the upper gland and the lower gland. Reference numeral 55 indicates a threaded receiver for receiving the connecting rods 54.

Figure 9:
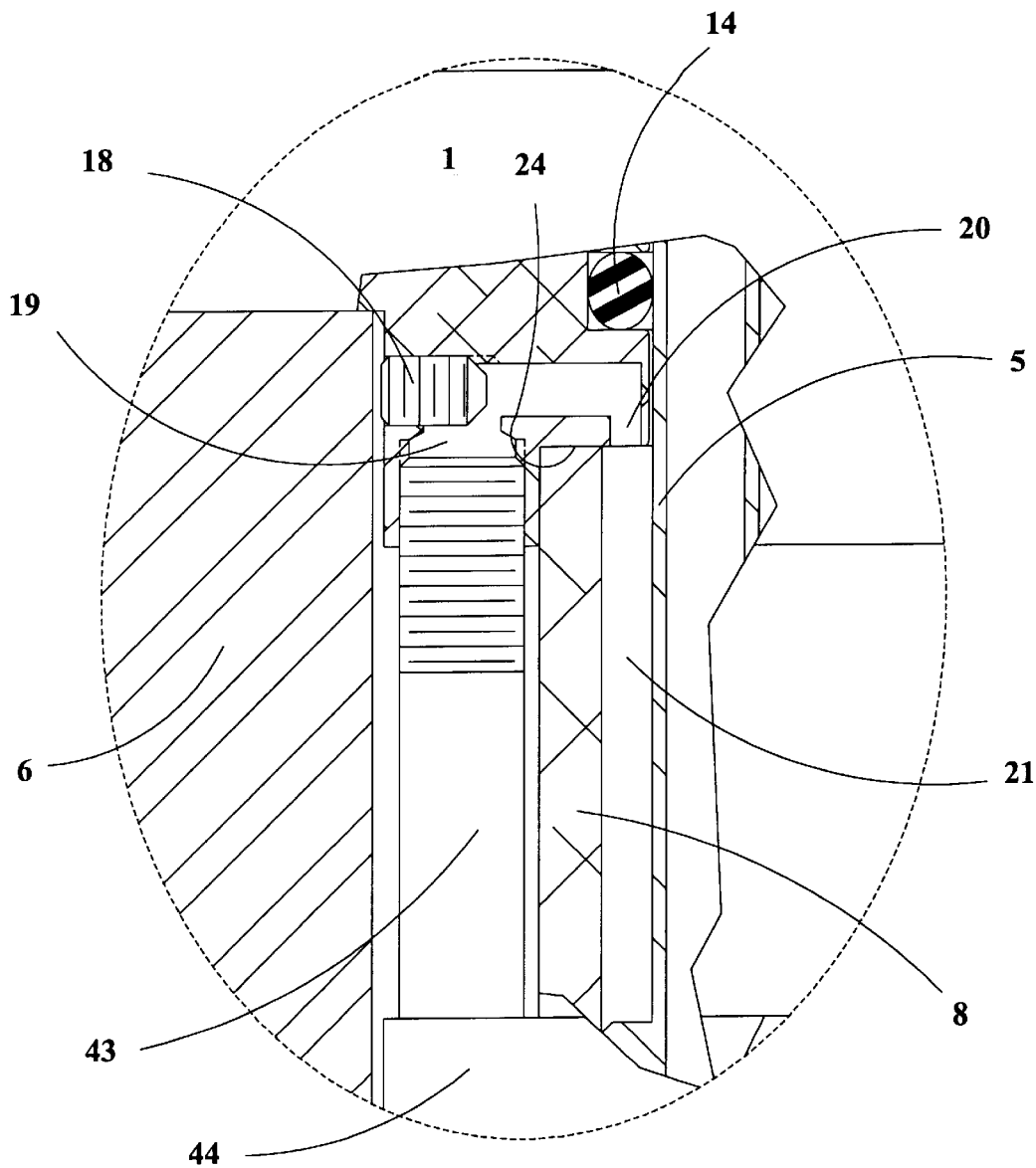
FIG. 9 is an enlargement of a portion of FIG. 8.

Referring to FIG. 9, an enlarged portion of FIG. 8, it can readily be seen where the outer piston 8 engages the seal face of the receiver.

Figure 2:
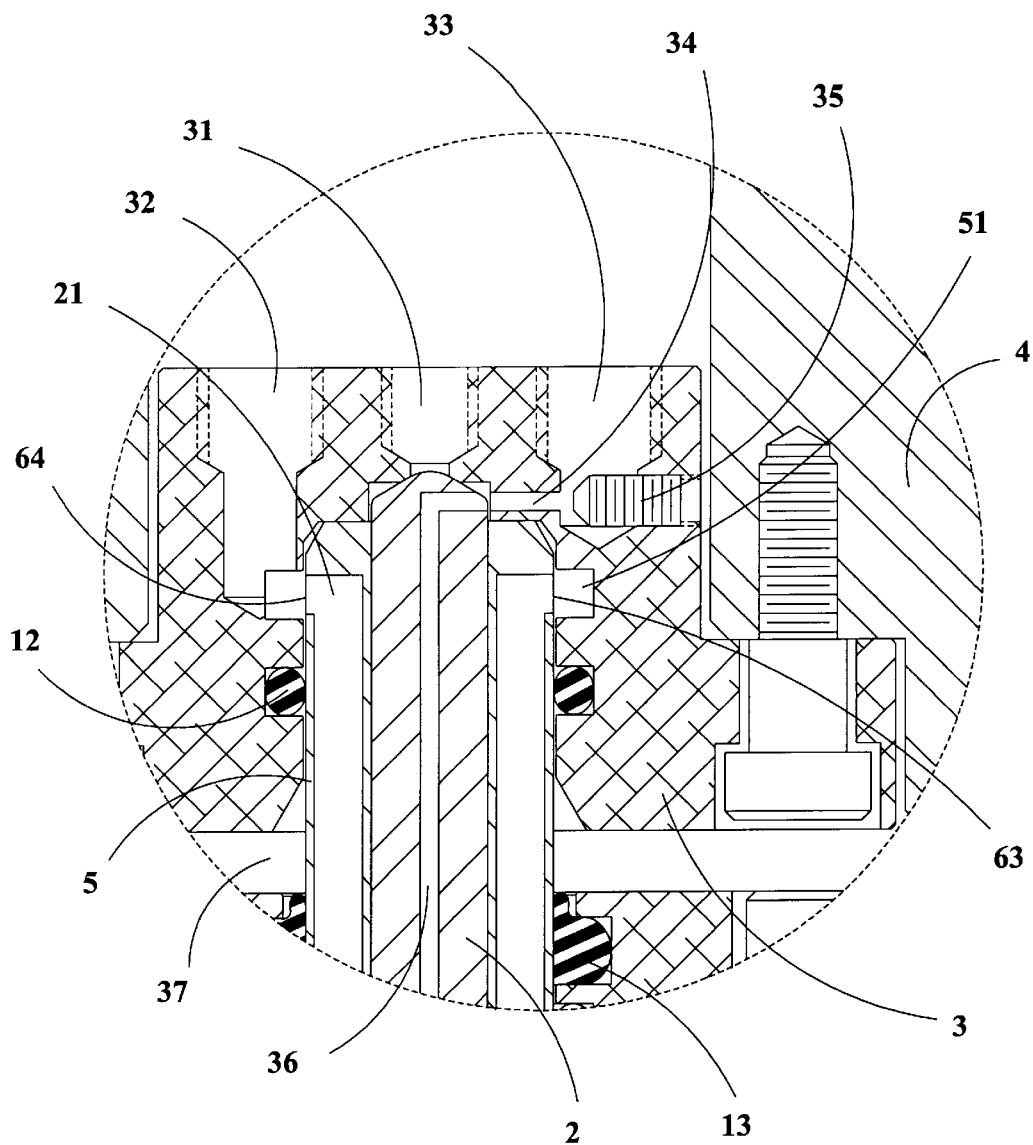
FIG. 2 is an enlarged portion of the coupling as illustrated in FIG. 1.

Referring to FIG. 2, it will be noticed that the inner piston 2 has a curved upper surface 38 which makes with a valve seat 65 on the receiver 3. When the inner piston is fully extended upwardly it seals off the vent port as illustrated in FIG. 2.

Referring to FIG. 6, shoulder 39 on the pallet is indicated as is shoulder 40 on the receiver. Shoulders 39 and 40 engage each other when the coupling is connected, to wit, when the outer piston engages the seal face surface 24.

Referring to FIG. 8, set screw 41 is illustrated occluding flow from exiting supply ring 44. Reference numeral 42 illustrates a slot in upper air supply ring 44.

Referring to FIG. 8, set screw 46 blocks flow from the lower supply ring 49. Reference numeral 47 is the slot in the lower supply ring 49.

Figure 10:
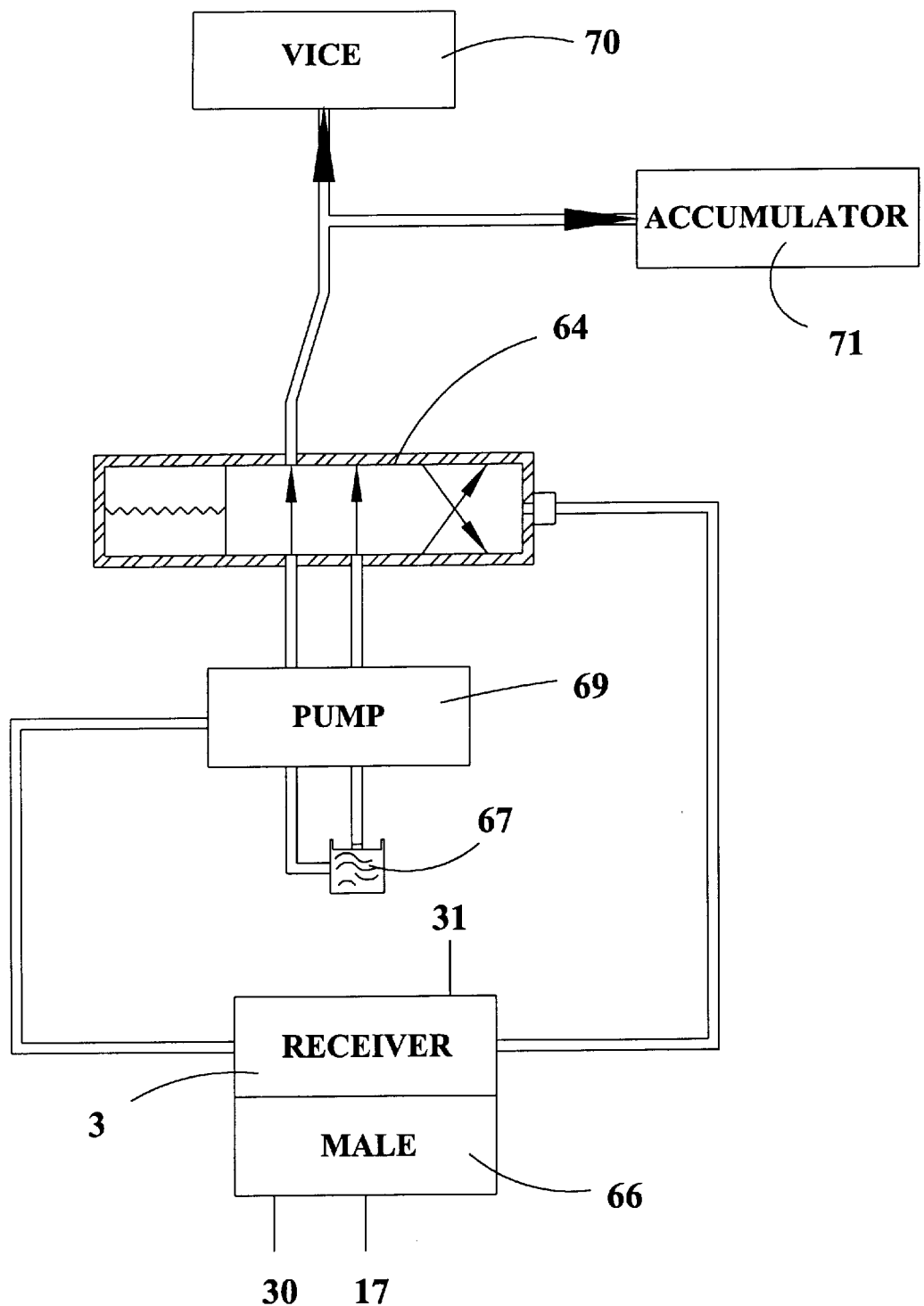
FIG. 10 is a schematic illustrating the male and female halves of the coupling engaged with the control port of the receiver deenergized and air pressure being supplied to drive pump in the forward direction to clamp the vice.

FIG. 10 is a schematic which illustrates the condition when air pressure is supplied to ports 30 and 17. In this condition there is no pressure on the pilot of the four-way valve. The inner piston 2 is down on the plug 50, the vent 31 of the receiver is operational because the inner piston has not seated against the seat 65. In the condition shown in FIG. 10 air is being supplied to the air driven pump 69 and oil is being pumped from the air driven hydraulic pump into both the vice 70 and accumulator 71. In the circumstance shown in FIG. 10 there could easily be more than one vice as those skilled in the art will readily appreciate. The number of vices is limited by the size of the oil reservoir 67. This invention has an advantage over other coupling equipment in that many vices may be supplied by a single air driven hydraulic pump.

Figure 11:
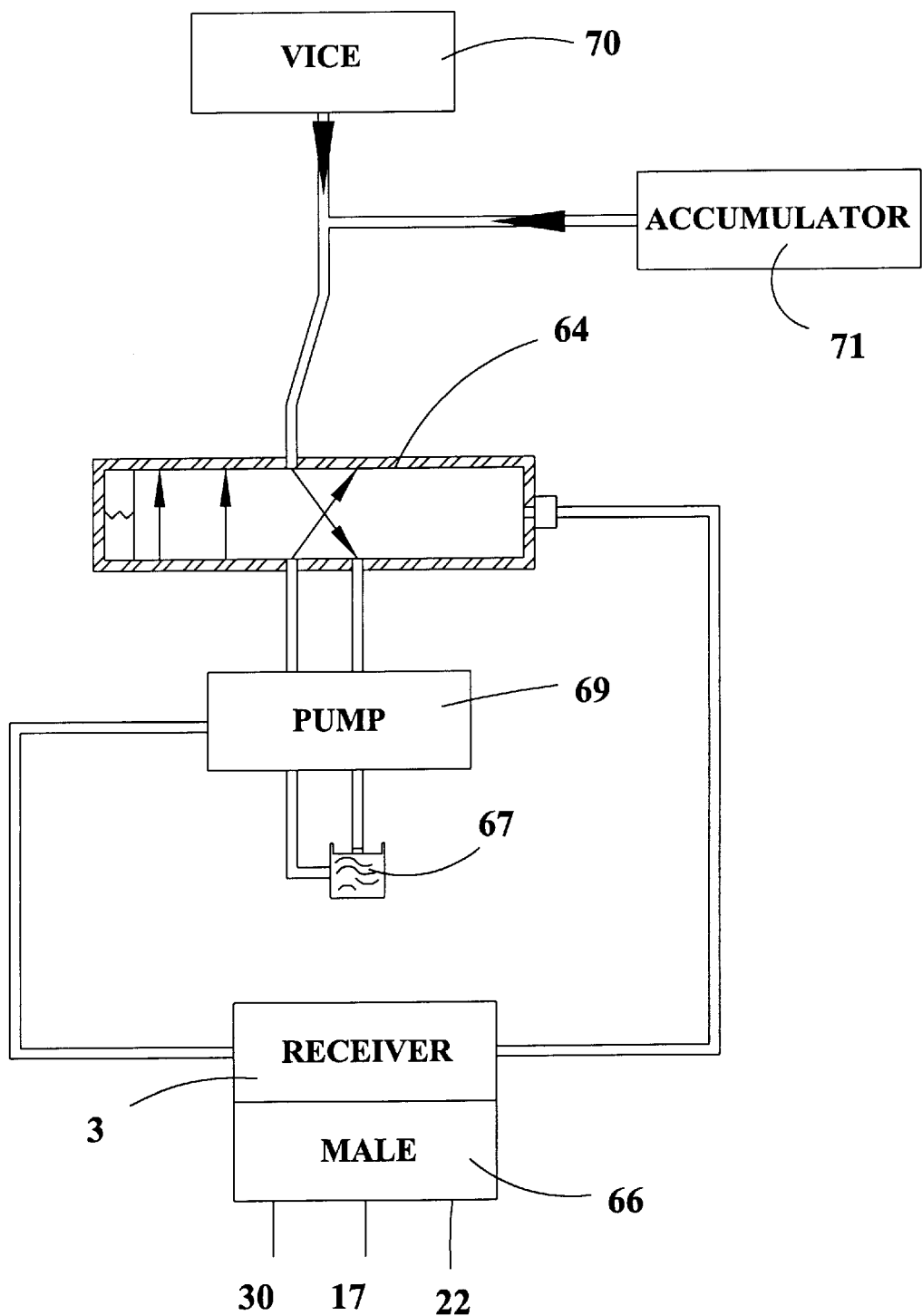
FIG. 11 is a schematic illustrating the male and female halves of the coupling coupled together with pressure being applied to the four-way valve which in turn results in the pump withdrawing fluid from the vice and the accumulator.

Referring to FIG. 11 the circumstance is illustrated where air pressure is being applied to ports 30, 17 and 22 simultaneously. In this configuration the pilot on the four-way valve 68 receives pressure from the receiver. The pump is now being supplied with air and is operating in a reverse direction withdrawing oil from the vice 70 and the accumulator 71. This unlocks the vice and allows for removal of the workpieces.

In the situation of FIG. 10 the vice is clamped and the workpieces may not be removed. The situation of FIG. 11 is the opposite, the vices are unclamped and the pieces may be removed.

I claim:

1. A coupling comprising a male half and a female half; said male half includes a cylinder closed at one end thereof, an outer piston residing partially within said cylinder, and an inner piston residing partially within said outer piston and moveable with respect to said outer piston; an upper gland and a lower gland; said upper and lower gland being affixed to said cylinder; said outer piston including an interior, an exterior, and a plug, said plug forming a closed end of said outer piston; said closed end of said cylinder and said closed end of said outer piston forming a piston chamber; said cylinder having a lower port and an upper port; said outer piston includes a first passageway for communicating between said lower port of said cylinder and said interior of said outer piston; said lower gland includes a port communicating with said piston chamber formed between said lower gland and said cylinder;

and, said female half of said coupling adapted to receive said outer piston of said male half of said coupling.

2. A coupling as claimed in claim 1 wherein said inner piston of said male half includes a passageway therethrough and said female half includes a receiver, said receiver includes a seal face, a vent port, a power port and a control port.

3. A coupling as claimed in claim 2 wherein said passageway of said inner piston of said male half of said coupling communicates with said control port of said female portion of said coupling when said male and female halves are coupled together.

4. A coupling as claimed in claim 1 wherein said female half of said coupling is suspended from a pallet.

5. A coupling as claimed in claim 3 wherein said male half further includes a retraction port in said upper gland.

6. A coupling as claimed in claim 5 wherein said male half further includes a spring residing between said outer piston and said inner piston urging said inner piston toward said closed end of said cylinder.

7. A coupling as claimed in claim 1 wherein said male half further includes a lower chamber formed between said outer piston and said cylinder and an upper chamber formed between said outer piston and said cylinder; said lower port of said cylinder communicating with said lower chamber and said lower chamber communicating with said first passageway of said outer piston for communicating with said interior of said outer piston; and, said outer piston further includes a second passageway for communicating between said upper chamber and said female half of said coupling when said male and female halves are coupled together.

8. A coupling for use in supplying air pressure to an air driven pump on a pallet comprising: a male half affixed to a pallet changing station and a female half suspended from a pallet; said female half includes a vent port, a power port and a control port; said male half includes a first piston having a first passageway and a second telescoping piston having a second passageway within said first piston; said second piston having a first position and a second position; said female half includes a shoulder which loosely engages said first piston permitting communication between said first passageway of said first piston and said vent and power port of said female half when said male half and said female half are coupled and said second piston is in its said first position; and, said second passageway of said second piston communicating with said control port of said female half and said first passageway of said first piston communicating with said power port of said female half when said male half and said female half are coupled and said second piston is in its said second position.

9. A coupling as claimed in claim 8 wherein said male half includes a spring operable between said first piston and said second piston.

10. A coupling as claimed in claim 9 wherein said male half further includes a cylinder which is closed at one end thereof, a piston chamber is formed by said closed end of said cylinder and said first piston.

11. A coupling for use in supplying air pressure to an air driven pump on a pallet comprising a male half and a female receiver; said male half includes a first outer piston having a first passageway and a second inner telescoping piston having a second passageway; said female half includes a shoulder for receiving said first outer piston, a power port, a vent port and a control port, and an annular chamber in communication with said power port; said first passageway of said first outer piston communicating with said annular chamber which is in communication with said power port when said male and female halves are coupled together [;] and, said second passageway of said second inner telescoping piston being in communication with said control port and sealingly engaging said vent port prohibiting flow through said vent port when said inner piston moves relative to said outer piston.

* * * * *